Aug. 12, 1941.  H. F. SMITH  2,251,960
REFRIGERATING APPARATUS
Filed June 1, 1936   6 Sheets-Sheet 2

Aug. 12, 1941.　　　H. F. SMITH　　　2,251,960
REFRIGERATING APPARATUS
Filed June 1, 1936　　　6 Sheets-Sheet 3

Fig. 5

Aug. 12, 1941.    H. F. SMITH    2,251,960
REFRIGERATING APPARATUS
Filed June 1, 1936    6 Sheets-Sheet 6

INVENTOR
Harry F. Smith
BY
Spencer Hardman and Fehr
ATTORNEYS

Patented Aug. 12, 1941

2,251,960

UNITED STATES PATENT OFFICE 2,251,960

REFRIGERATING APPARATUS

Harry F. Smith, Dayton, Ohio, assignor to General Motors Corporation, Dayton, Ohio, a corporation of Delaware Application June 1, 1936, Serial No. 82,726

11 Claims. (Cl. 62—140)

This invention relates to refrigerating apparatus and more particularly to portable air cooled air conditioning means or room coolers.

Portable air cooled conditioners or room coolers have been proposed and tried for some time, but no one appears to have attained commercial success in the building and sale of such equipment. In such systems there have been difficulties encountered in positioning the condenser, in disposal of the waste heat of the motor-compressor unit and in disposal of the drip water. There has also been difficulty in providing means for properly connecting the condenser with the remainder of the refrigerating system. All these difficulties seem to have delayed commercial success of this type of refrigerating unit.

It is an object of my invention to provide an improved portable air cooled conditioning unit or room cooler provided with improved apparatus for the cooling and condensing the refrigerant, for the disposal of waste heat of the motor-compressor unit, and the disposal of the drip water.

It is also an object of my invention to provide an improved portable air cooled conditioner or room cooler which can be readily moved from room to room and used wherever desired.

It is a further object of my invention to provide an air conditioner or room cooler in which improved readily adjustable supporting means for the condenser are provided and in which there is provided improved refrigerant connections between the condenser and remainder of the refrigerating system.

Further objects and advantages of the present invention will be apparent from the following description, reference being had to the accompanying drawings, wherein a preferred form of the present invention is clearly shown.

Figure 1:
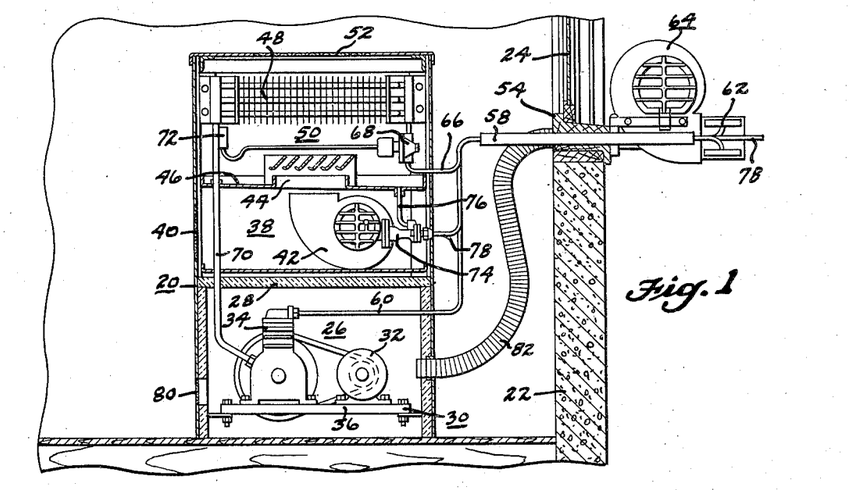
Fig. 1 is a vertical sectional view through a portion of a room and one form of my improved portable air conditioning unit.

Briefly, in Fig. 1, I have shown a portable air conditioning unit or room cooler having an insulated machine compartment in the bottom of the cabinet, an evaporator or cooling compartment in the top of the cabinet, and a drip pan beneath the evaporator compartment which separates the evaporator compartment from the fan compartment. A centrifugal fan is provided in the fan compartment which draws in air through an opening in the wall of the compartment from the room and discharges the air into the evaporator or cooling compartment from which the air is discharged to the room. A motor-compressor unit is provided in the machine compartment which is connected by flexible refrigerant conduits to a condenser disposed outside of the window of the room containing the room cooler. A centrifugal fan is provided for circulating air through the passages in the condenser. The centrifugal fan in the fan compartment is also provided with a pump of the type shown in Fig. 3 with the exception that it has no spray nozzle and discharges the condensate through a tube out of the room at a point beyond the condenser. The waste heat from the motor-compressor unit in the machine compartment is removed by air which is admitted through an inlet in a wall of the machine compartment and discharged through a flexible air duct made of fabric, rubber and metal reinforcement which conducts the air to the inlet of the centrifugal fan which supplies the air for cooling the condenser.

Figure 2:
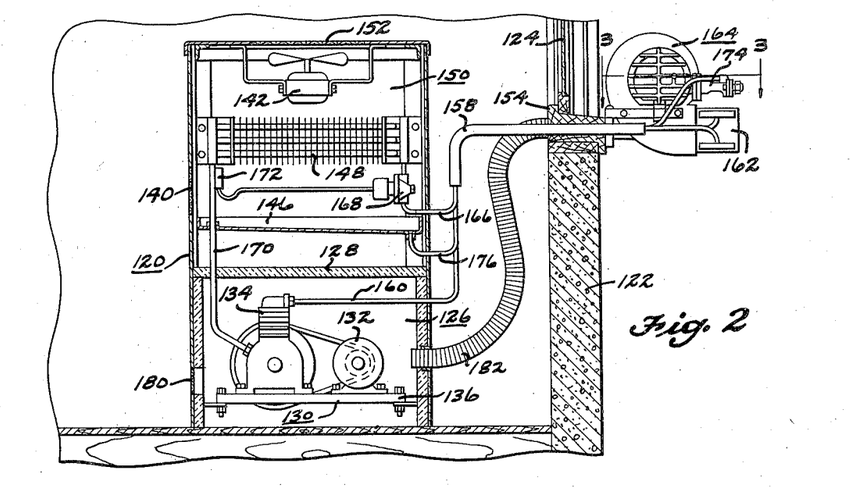
Fig. 2 is a sectional view of a room together with a vertical sectional view through another form of my improved air conditioning unit.
Figures 3, 4:
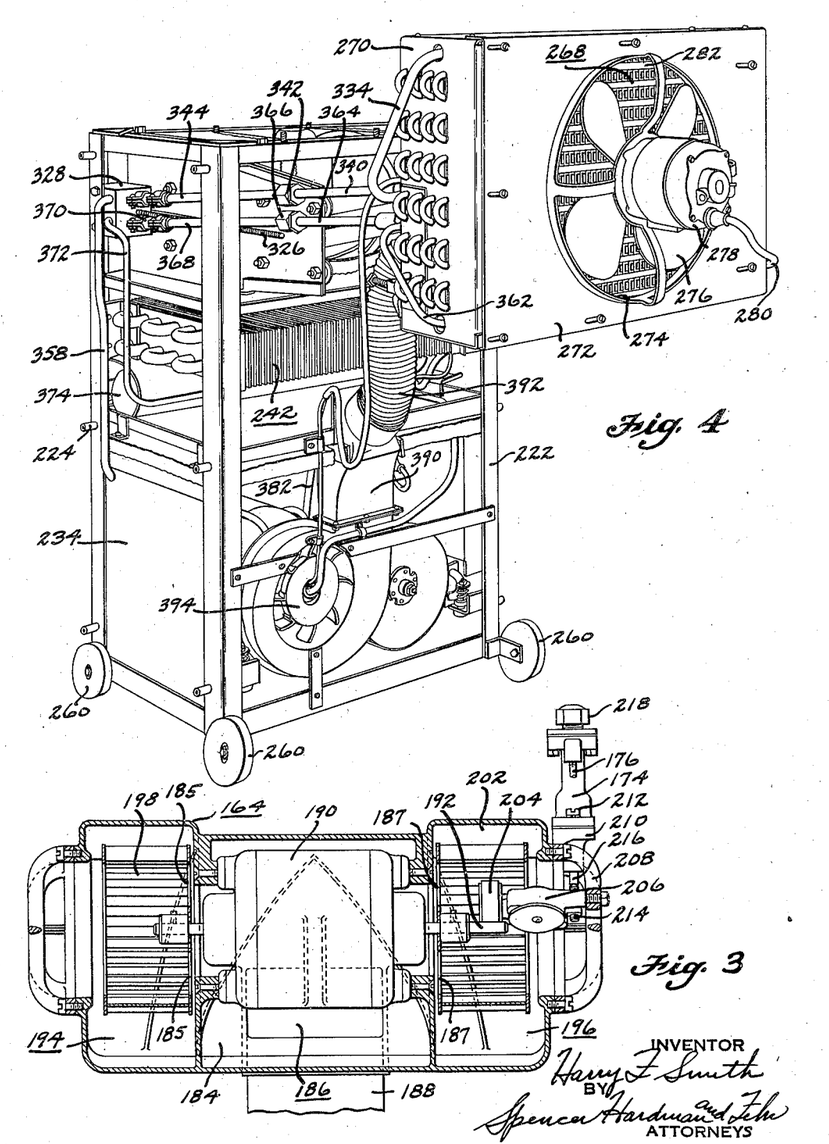
Fig. 3 is a sectional view taken along the lines 3—3 of Fig. 2 but omitting the condenser proper.
Fig. 4 is a perspective view of another form of air conditioning unit with the ornamental panels removed to expose the details of construction.

In Figs. 2 and 3, a modified form is shown in which the machine compartment is again at the bottom of the cabinet and the evaporator compartment is at the top of the cabinet. In the evaporator compartment, however, the fan is of a propeller type and is placed above the evaporator for drawing air from the room beneath the evaporator, thence through the passages in the evaporator and discharging the air back into the room through an opening in the top of the cabinet. In this modification, a centrifugal fan is placed outside of the window and discharges through the passages in the condenser. The machine compartment is also provided with an inlet for admitting air and an outlet connected by a flexible duct of fabric rubber and metal to the inlets of the centrifugal fans so that about 40 to 50 cubic feet per minute of air is drawn through the machine compartment in this manner in order to dispose the waste heat of the motor-compressor unit. The centrifugal fans also drive a pump which draws condensate from the drip pan and sprays it into the air above the condenser outside the room.

In the modification shown in Figs. 4 to 11 inclusive, the machine compartment is again at the bottom and contains a motor-compressor unit. The evaporator or cooling compartment is directly above the machine compartment and is provided with the drip pan beneath the evaporator. Above the evaporator is a fan within a fan compartment which draws air from the evaporator compartment and discharges the air diagonally upwardly through an opening in the top of the cabinet. The condenser is located outside of the window of the room and is supported by a readily adjustable supporting means provided on the cabinet. The condenser is cooled by a propeller type fan which draws the air through the passages of the condenser. In the machine compartment there is provided a centrifugal fan for drawing air from the room through an opening into a machine compartment and discharging the air at the rate of about 40 to 50 cubic feet per minute through a flexible duct formed of fabric, rubber and metal reenforcement to the condenser outside of the window. This centrifugal fan is also provided with a water chamber which receives condensate from the drip pan and which throws this condensate by centrifugal action into impingement with the mouth of a spiral tube for forcing this condensate through a tube to the condenser disposed outside of the window. At the inlet for the air of the machine compartment there is placed a precooling heat transfer coil which receives the hot gas from the compressor and cools it to a moderate temperature before the compressed refrigerant is conducted through portions of refrigerant conduits of rubber-like material which connect to the condenser located outside of the window.

Referring now to the drawings and more particularly to Fig. 1, there is shown an air conditioning cabinet 20 located in a room 22 containing a window 24 near the cabinet 20. This cabinet 20 has a machine compartment 26 in its lower portion provided with insulating slabs 28 upon the inner faces of the walls. The machine compartment contains a motor-compressor unit 30 including a motor 32, a compressor 34 mounted upon a base 36 which is supported upon springs by the structural walls of the cabinet. Immediately above the machine compartment there is provided a fan compartment 38 having an inlet 40 for admitting air from the room. This fan compartment is provided with a centrifugal fan 42 which draws in air into the compartment 38 from the room through the opening 40 and discharges the air upwardly through an opening 44 in the drip pan 46 which serves as the top of the compartment. This drip pan 46 collects any moisture or condensate which condenses from the air and is deposited upon the surfaces of the evaporating means 48 located in a cooling compartment 50 directly above the drip pan 46. This cooling compartment has an outlet 52 in the top of the cabinet for discharging the air back into the room.

The window 24 is preferably provided with a window sill 54 of much greater thickness than is customary. This window sill 54 receives a tubular member 58. Through this tubular member 58 extends a flexible refrigerant conduit means 60 extending from the compressor 34 in the machine compartment to the condenser 62 located outside the window fastened to this window sill. This condenser is cooled by air discharged from a double ended centrifugal fan 64 which discharges directly into the air cooling passages of the condenser 62. This centrifugal fan is constructed similarly to the centrifugal fan shown in Fig. 3 but with the omission of the pump unit.

The compressed refrigerant from the comressor is condensed and liquefied in the condenser 62 and is forwarded through a supply conduit 66 which extends through the metal tube 58 to a thermostatic automatic expansion valve 68 located within the cooling compartment 50. This thermostatic expansion valve controls the supply of liquid refrigerant to the evaporating means 48. The evaporating means 48 absorbs heat from the air which is circulated through the cabinet by the centrifugal fan 42 and evaporates the liquid refrigerant under reduced pressure. This evaporated refrigerant is returned to the compressor through the return conduit 70. The thermostatic element of the thermostatic bulb 72 is located in contact with the return conduit 70 adjacent the evaporating means 48.

The centrifugal fan 42, as mentioned before, is similar to the centrifugal fan shown in Fig. 3 and is similarly provided with a slow speed pump 74 which is driven directly from the drive shaft of the motor-fan unit. This pump 74 has its inlet connected by a tube 76 to the bottom of the drip pan 44 in order to remove condensate from the drip pan and discharges the condensate through a discharge conduit 78 which extends through the tube 58 into the air at a point beyond the condenser 62.

The machine compartment 26 is provided with an inlet 80 for admitting air from the room and an outlet to which is connected a flexible duct 82 formed of fabric, rubber and metal reenforcement. This flexible duct 82 extends through the extra thick window sill 54 to the central portion of the double ended centrifugal fan which is under a vacuum created by the fan so that air is constantly drawn through the machine compartment to absorb the waste heat of the motor-compressor unit by the condenser fan which draws this warm air through the flexible duct 82. This form of air conditioning apparatus may be placed in any room where there is a window and a source of electrical supply. The connections between the air conditioning cabinet and the condenser unit are flexible and will accommodate considerable displacement. The condensing unit is relatively light and may be readily fastened outside the window. The condensate and the waste heat from the machine compartments are disposed of in a simple and relatively convenient manner, without requiring additional electric motors for performing these functions.

In Fig. 2 there is shown a room 122 containing an air conditioning cabinet 120 adjacent a window 124. In the lower portion of the air conditioning cabinet 120, there is a machine compartment 126 provided with walls having insulating slabs 128 upon their inner surfaces for preventing the escape of heat from the machine compartment to the air in the room. Within the machine compartment is a motor-compressor unit 130 including a motor 132 and a compressor 134 driven by the motor, as well as the base 136 for supporting both the motor and the compressor.

Above the machine compartment is a cooling or evaporator compartment 150 containing a transversely positioned evaporating means 148 and a drip pan 146 beneath the evaporating means 148. This cooling compartment is provided with an inlet 140 for admitting air from the room beneath the evaporator 148. This cooling compartment is also provided with an outlet 152 above the evaporator and a propeller type motor fan unit 142 for drawing air through the passages in the evaporator and discharging air upwardly through the outlet 152. The window 124 is provided with an extra thick window sill 154 which receives refrigerant conduit means extending between the cabinet 120 and the condensing unit which is mounted upon the sill outside the window 124.

The refrigerant compressed by the compressor 134 is discharged through a flexible refrigerant conduit 160 which extends through a tube 158 extending through the extra thick window sill 154 to a condenser 162 which is mounted at the outlet of a double ended centrifugal fan 164 shown in Fig. 3. This centrifugal fan forces air through the passages in the condenser, thereby cooling and condensing the compressed refrigerant which in a liquid state is forwarded through a supply conduit 166 to an automatic thermostatic expansion valve 168 in the cooling compartment 150 beneath the evaporator 148. This automatic thermostatic expansion valve controls the supply of liquid refrigerant to the evaporator means 148. The evaporating means 148 absorbs heat from the air which is circulated through the passages of the evaporator by the propeller type motor fan unit 144 and evaporates the liquid refrigerant under reduced pressure. This evaporated refrigerant is returned to the compressor through the return conduit 170. The thermostatic element of the thermostatic expansion valve is controlled by a thermostatic bulb 172 mounted upon the return conduit 170 at the outlet of the evaporating means 148.

The machine compartment 126 is provided with an inlet opening 180 for admitting air from the room and an outlet which is connected to a flexible duct 182 formed of fabric rubber and metal reenforcement. This duct 182 extends through the extra thick window sill into the motor chamber of the double ended centrifugal fan 164 which is under vacuum created by the operation of the fans. This circulation of air through the machine compartment absorbs the waste heat from the motor-compressor unit and disposes of the heated air outside the room. The condensate in the drip pan 146 is removed by a suction conduit 176 connecting to the bottom of the drip pan and extending through the tube 158 to a pump 174 mounted upon and driven directly by the motor fan unit 164.

In this motor-fan unit 164, best shown in Fig. 3, there is provided a central chamber 184 provided with an inlet 186 which connects through a metal duct 188 to the flexible duct 182. This central chamber 184 supports on vibration absorbing mountings an electric motor 190 provided with a double ended drive shaft 192 which extends into the fan chambers 194 and 196 on either side of the central chamber 184. The fan chamber 194 is provided with a centrifugal fan 198 mounted upon one end of the double ended shaft 192 and while a similar centrifugal fan 202 is mounted upon the opposite end of the double ended motor shaft 192 within the fan chamber 196. The relatively large openings in the wall between the central chamber and the two fan chambers 194 and 196 are provided surrounding the double ended motor shaft 192. These openings, however, are each partially closed by the plate or disc on one side of the adjacent centrifugal fan. Each of these plates or discs, however, is provided with four large holes 185 and 187 respectively, which permit the flow of air from the motor compartment into the interior of the fan so that the motor compartment is kept at suction pressure. Through this means a sufficient vacuum is created in the motor compartment to draw air from the machine compartment through the duct 182 to remove the waste heat of the motor-compressor unit. This circulation of air also improves the cooling of the motor 190.

The pump 174 is driven from the right end of the double ended motor shaft 192 as viewed in Fig. 3. This end of this shaft is made especially long and is contacted by an eccentric rubber-tired roller 204 which is rotatably mounted upon a member 206 which is pivoted to the inlet guard 208 of the fan 202. This inlet guard 208 is provided with a flanged guide 210 to which the pump 174 is fastened by cap screws 212. The pivoted member 206 is provided with a set screw 214 which engages a pin 216 which in turn operates the piston within the pump 174. Since this eccentric wheel has a diameter five or six times as great as the diameter of the shaft 192, the pump will be reciprocated by reason of the eccentricity of the wheel about once every five or six revolutions of the motor 190. The pump 174 is provided with a discharge spray head 128 at its head end for spraying the condensate into the air outside the room.

Referring now to Figs. 4 to 11 inclusive for the last of the modifications, there is shown an air conditioning cabinet or room cooler 220 having angle iron framework 222 provided with projecting pegs 224 which receive the ornamental outer panels 226 which form the outer walls of the cabinet. In the bottom part of the cabinet there is provided a machine compartment 228 which is enclosed by insulating slabs 230 and 232 located at the top and bottom of the machine compartment and side slabs 234 at the side of the machine compartment. The machine compartment contains compressor unit 236 mounted upon a base. This motor-compressor unit includes an electric motor 236 and a compressor 238 which is driven by the electric motor through pulley and belt means.

Figure 6:
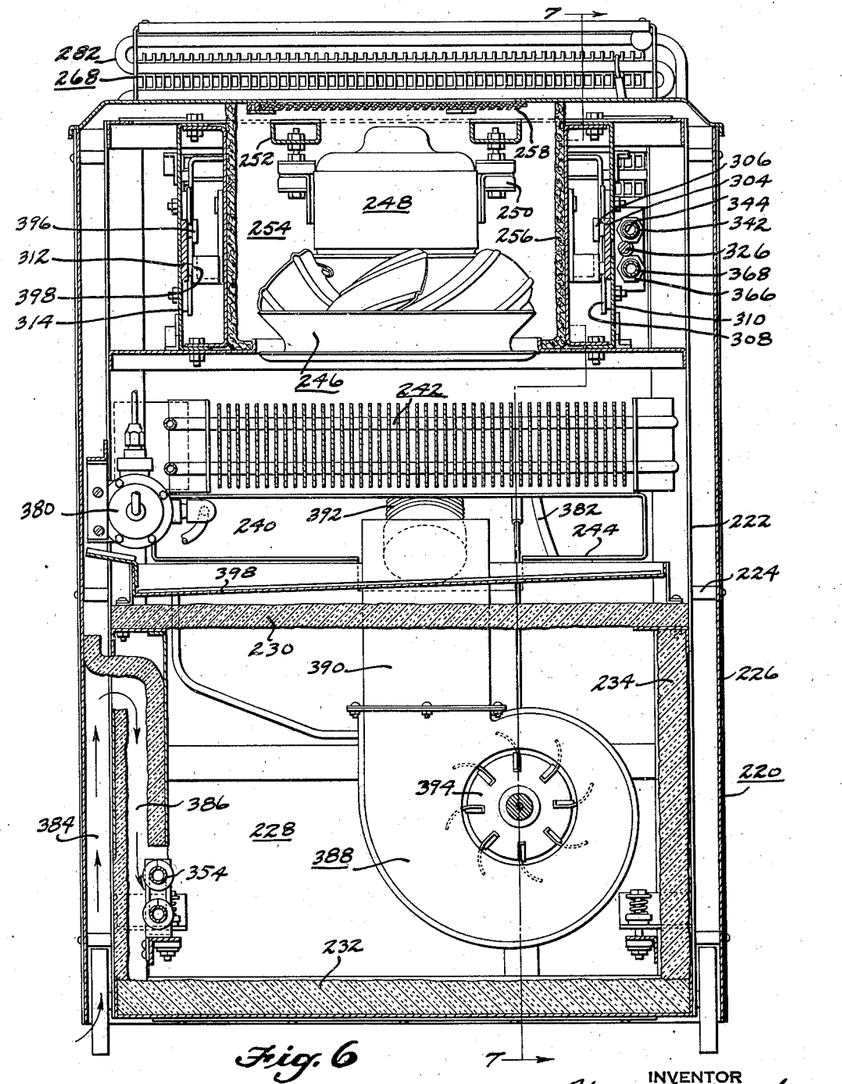
Fig. 6 is a vertical sectional view of the cabinet shown in the position of Fig. 5.

Directly above the machine compartment 238 is an evaporator or cooling compartment 240 containing a finned evaporating means 242 positioned transversely within the cooling compartment. The cooling compartment is provided with an inlet 244 at one side beneath the evaporating means 242 and an outlet in the wall directly above the evaporating means. This outlet receives a fan 246 of a rather peculiar type which is directly driven by an electric motor 248 suspended upon rubber mountings 250 from cross members 252, all of which is located within the fan compartment 254. This fan compartment is lined with a sound insulating material 256 to absorb the air noises of the fan. This fan compartment has an opening in its top provided with a grille 258 through which the air is discharged obliquely upwardly. This air is drawn into the compartment 240 through the inlet 244, thence passes upwardly between the fins of the evaporating means 242, thence through the opening occupied by the fan into the fan compartment from which it is discharged through the grille 258.

The cabinet rests upon four rollers 260 rotatably mounted upon the four bottom corners of the angle iron frame 222.

Figure 5:
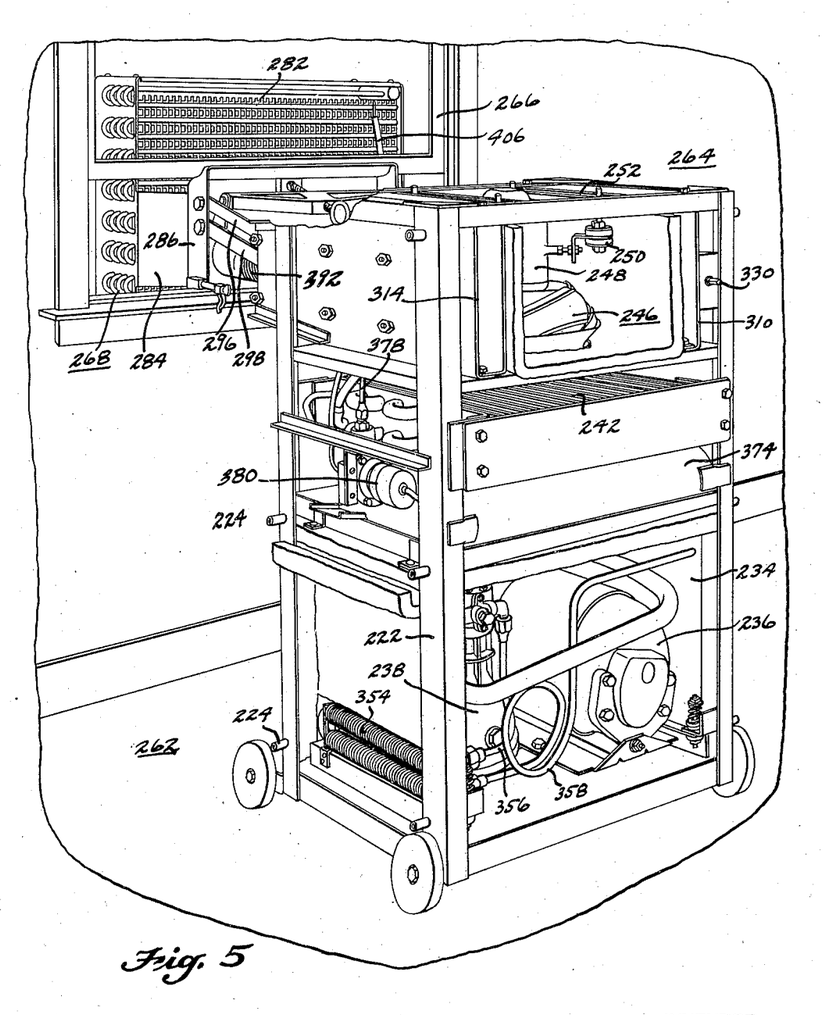
Fig. 5 is a perspective view of the opposite side of the air conditioning unit shown in Fig. 4 as showing it in position at a window.

This air conditioning cabinet 220 is intended to be located within a room 262 to be cooled having a wall 264 provided with a window 266. The heat which I take from the room, I dissipate in a condenser unit 268 located outside the room. This condenser unit is provided with a sheet metal enclosure 270 which extends around the sides and top of the unit and which also includes a rear panel 272 provided with an opening 274 within which is mounted a propeller type fan 276 driven by an electric motor 278 supported by the back panel 272. The condenser proper 282 is enclosed within the sheet metal enclosure 270. This motor 278 is supplied with electric energy through the electric conductor 280 and draws air between the window and the other face of the condenser proper 282 and thence draws the air through the opening 274 on the opposite side in order to provide a circulation of air through the air passages in the condenser.

Figure 9:
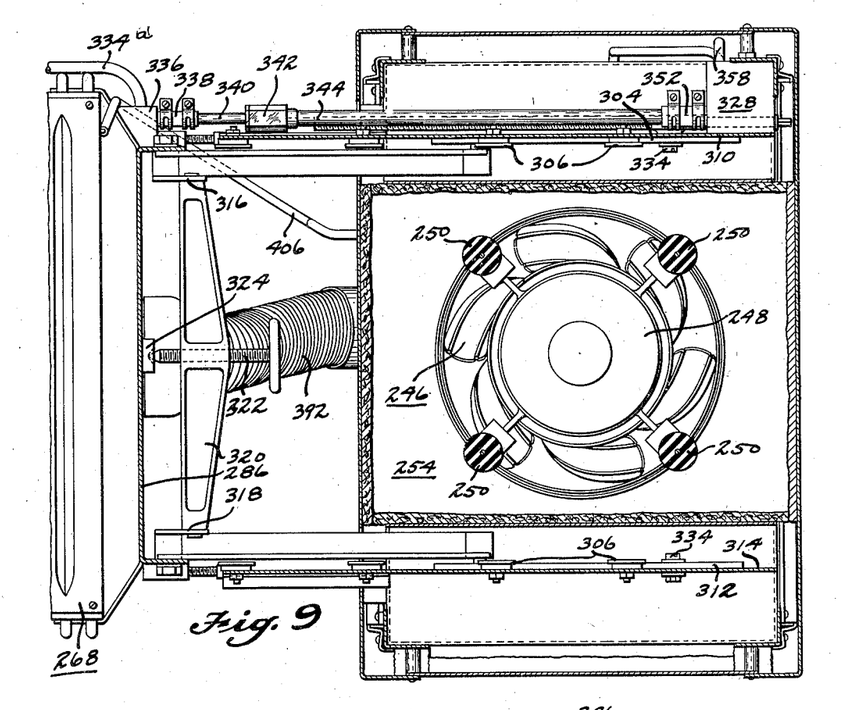
Fig. 9 is a horizontal sectional view looking down upon the support for the condenser.

This condenser is supported by an adjustable support from the cabinet 220. In order to do this, I provide metal plates 284 which fasten to the sheet metal enclosure 270 of the condenser unit. These metal plates 284 extend from a cast member 286. This cast member 286 has a lower projection 288 which rests on the outer side of the window ledge, while the other side of the ledge receives a threaded clamping device 290 for clamping this member to the window sill. This casting 286 is pivotally connected to the ends of four parallel links of which one pair, 292 and 294 are provided upon one side and a second pair 296 and 298 are provided on the other side. The links 292, 294 are pivotally connected at the opposite ends by bolts 302 to a slide bar 304 supported upon upper and lower rollers 306 and 308. These rollers 306 and 308 are supported by the side wall of a box-shaped sheet metal member 310 which is located upon one side of the fan chamber 254. Upon the opposite side of the cabinet the links 296 and 298 are fastened to a slide bar 312 located within the box-shaped sheet metal member 314 similarly provided with rollers at the top and bottom of the slide bar for supporting the slide bar.

The lower link 294 is provided with an upwardly extending projection 316 and the lower link 298 is provided with similarly upwardly extending projection 318. Pivotally connected to the upper ends of these projections 316 and 318 is a cast cross-bar 320 provided with a screw 322 having a handle. This screw bears against the block 324 which is fastened to the casting 286. By turning the screw 322 in such a direction as to increase the distance between the block 324 and the cross-bar 320, the condenser unit 268 will be raised with respect to the slide bar 304. Likewise, by turning the screw in the opposite direction, the condenser unit will be lowered. This is accomplished by reason of the rotative action of the screw 322 acting through the bar 320 and the upwardly extending projections 316 and 318 to turn the lower bars 294 and 298 about the pivotal connections by which they connect with the casting 286.

Figures 7, 8:
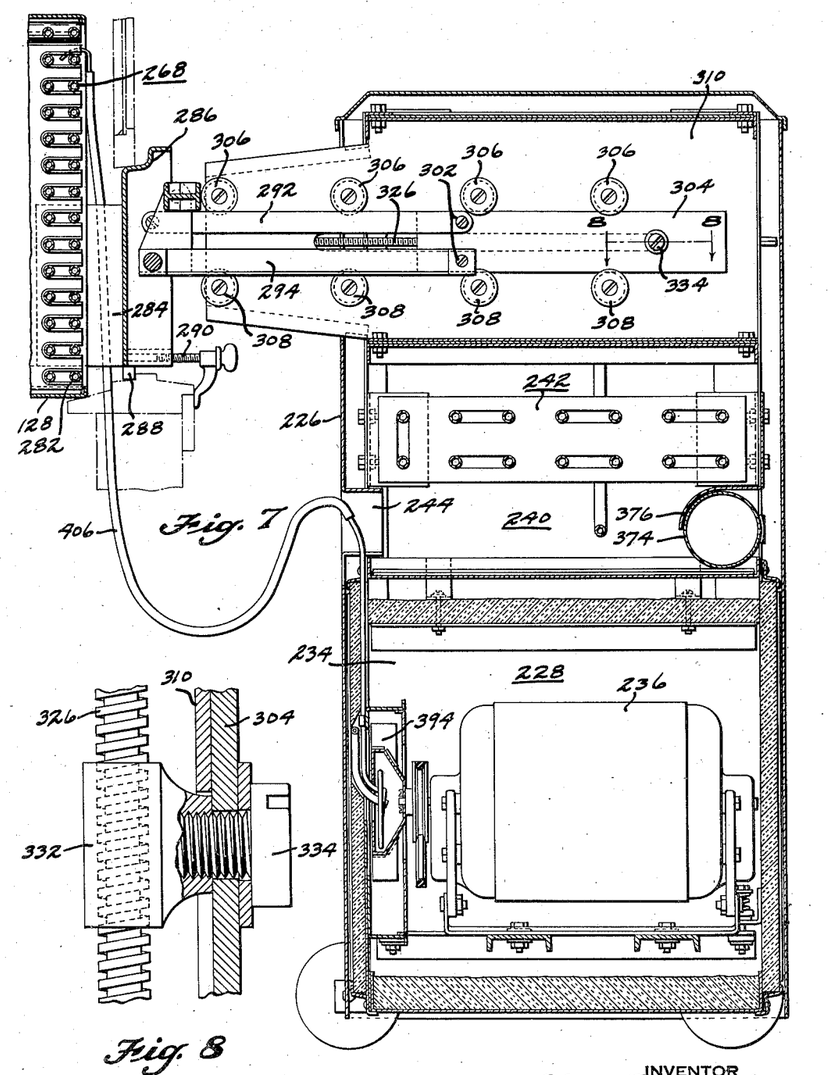
Fig. 7 is a vertical sectional view taken along the lines 7—7 of Fig. 6.
Fig. 8 is a sectional view taken along the lines 8—8 of Fig. 7.

In order to move the condenser unit and slide bars 304 and 312 toward and away from the cabinet proper 220, I provide a long threaded shaft 326 which is rotatably mounted within a block 328 fastened to the framework of the cabinet. This threaded shaft extends through the block 328 and is provided with a square head 330 on that end so that this shaft may be readily turned in either direction by a crank. This threaded shaft is provided with a nut 332 as is best shown in Fig. 8, which is fastened to the slide bar 304 by a flat headed screw 334. The turning of the screw moves the nut with respect to the cabinet and thereby moves the slide bar 304 in or out to any position desired.

Figures 10, 11:
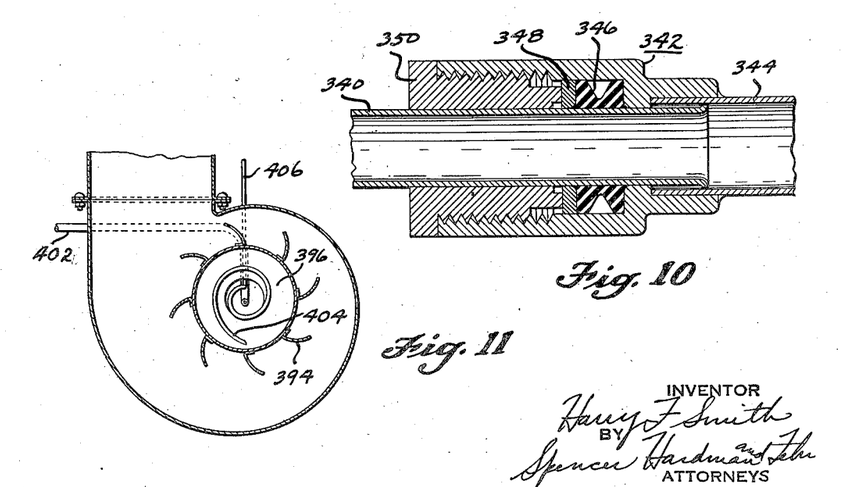
Fig. 10 is a sectional view of the packing gland for a telescoping joint of the refrigerant condensate shown in Fig. 9.
Fig. 11 is a sectional view of the centrifugal fan and drip disposal pump shown in Figs. 6 and 7.

The inlet conduit 334ᵃ of the condenser is connected into a block 336 upon the cast member 286. This block is connected by a flexible rubber-like conduit means 338 to an inner telescoping tube 340 of metal. The rubber-like conduit is preferably formed of fabric coated with a compound containing polymers of chloro-2-butadiene-1,3. The inner telescoping tube 340 slides into a gland 342 which is sealed to the end of the outer telescoping tube 344. This gland 342 is provided with a packing 346. This packing 346 preferably is a compound of polymers of chloro-2-butadiene-1,3. A ring 348 and a gland nut 350 are used to apply an axial pressure to the packing in order to hold it in tight engagement with the inner telescoping tube 340 to prevent leakage of refrigerant. The other end of the outer tube is connected by a flexible rubber-like conduit means 253 into the block 328 which receives the threaded shaft 326.

These rubber-like connections and packings have an extremely long life providing the temperature is maintained below 170° and 180° F. However, in an air conditioning unit the temperature of the compressed refrigerant discharged from the compressor is often above such temperatures. Therefore, I have provided a pre-cooling heat transfer coil 354 which is connected by the conduit 356 to the outlet of the compressor 238. This heat transfer coil 354 cools the compressed gases to a temperature amply below 180° F. so as to preserve the life of the rubber-like connections and packing. From this heat transfer coil the compressed gases are conducted through a conduit 358 to the block 328 from which point the gases pass through the telescoping tube 344 and 340 to the inlet of the condenser unit.

The outlet conduit 362 of the condenser is connected to a second passage in the block 336 which in turn is connected by a flexible rubber-like conduit to an inner telescoping tube 364 which extends into the gland 366 and the outer telescoping tube 368. This outer telescoping tube 368 is connected by the flexible rubber-like conduit 370 to the block 328. This block 328 is connected by a conduit 273 to the cylindrical receiver 374 mounted horizontally at one side of the cooling compartment 240 beneath the evaporating means 242. By placing the receiver in the cooling compartment 240, it is kept cooler than the condensing means and thereby prevents re-evaporation of the liquid cooling therein. This receiver 374 is shielded from the evaporating means by a shield 376 for preventing excessive cooling of the receiver 374. This shield also protects the receiver 374 from the condensate which drips from the evaporating means 242.

This receiver 374 is placed in the cooling compartment so that it will be cooler than the condenser and thereby be at a slightly low pressure so that sufficient pressure differential between the condenser and receiver is provided for forcing the liquid from the bottom of the condenser through the telescoping conduit means to the receiver regardless of whether the condenser is above or below the receiver. It will be noted that more than one-third of the receiver is below the telescoping conduits so that a slight pressure differential is required to maintain the liquid refrigerant in the condenser below these conduits. The conduits, however, connecting the outlet of the condenser with the receiver are sufficiently small so as to provide a sufficient restriction to any gases to prevent the condensation of any appreciable amount of compressed gas within the receiver. The locating of the receiver within the cooling compartment also provides precooling of the liquid before it is conducted from the receiver through the conduit 378 to the thermostatic automatic expansion valve 380.

This valve 380 controls the flow of liquid refrigerant into the evaporating means. Within the evaporating means the liquid evaporates under reduced pressure and absorbs heat from the air which is drawn through the cooling compartment by the fan 246. This evaporated refrigerant is returned to the compressor through the return conduit 382.

The operation of the motor-compressor unit creates heat within the machine compartment 228. In order to dispose of this heat I provide in one wall of the machine compartment an upwardly extending air inlet passage 384 followed by a downwardly extending air inlet passage 386 for admitting air from the room into the machine compartment. The inlet passage 386 is provided with sound insulation material on either side for preventing the escape of noises from the machine compartment. The precooling heat transfer coil 354 is placed at the bottom of the inlet passage 386 so that the air from the room is first used to cool this precooling heat transfer member 354. After passing into heat exchange relation with the precooler 354, this air absorbs heat from the motor-compressor unit within the machine compartment and is then drawn into a centrifugal fan 388 which has its impeller 394 mounted upon the pulley end of the compressor motor 236. This centrifugal fan is provided with a discharge duct 390 which discharges into a flexible duct 392 formed of fabric, rubber, and metal reenforcement. This duct extends through the member 286 outside the window. The operation of the centrifugal fan creates a sufficient circulation over the precooler and through the machine compartment to dispose of the waste heat of these units.

The impeller 394 of the centrifugal fan contains a water chamber 396 which receives the condensate from the drip pan 398 located directly beneath the evaporating means 242. This drip pan collects the condensate from the evaporating means 242 as well as any which collects upon the expansion valve and this condensate is conducted by the conduit 402 to this water chamber 396. This condensate within the chamber 396 is thrown to the outside by centrifugal action and tends to be whirled around with the outer falls of this chamber. In order to dispose of this water I provide a spiral tube 404 having a mouth within in the bottom of the water chamber 396 so that the impact of the water carried around the outside of the water chamber will force the water through the spiral water coil to a connecting tube 406 extending to the upper portion of the condenser where it may be evaporated by the heat of the condenser and the air flowing through the passages in the condenser. This form of pump is extremely simple and inexpensive and creates a relatively high pressure and is suitable for disposing of the comparatively small amount of condensate collected by the drip pan.

The condenser unit has a range of movement of about 18 inches toward or away from the cabinet proper and has a range of movement upwardly or downwardly about 9 or 12 inches in either direction. This adjustment can be readily made and since the cabinet is provided with rollers the entire unit may be moved from room to room readily as desired since it merely requires an electric connection and a window opening. It is believed that this is of considerable advantage.

While the form of embodiment of the invention as herein disclosed, constitutes a preferred form, it is to be understood that other forms might be adopted, all coming within the scope of the claims which follow.

What is claimed is as follows:

1. Refrigerating apparatus including a cabinet located in a room, said cabinet including a machine compartment and having an evaporating means located outside of the machine compartment, said machine compartment containing a motor-compressor unit, a condenser located outside the room, a fan located outside said room for circulating air into heat exchange relationship with said condenser, said machine compartment having an opening for admitting air from the room and an outlet connected by conduit means to the inlet of said fan located outside the room, and a pump driven by said fan for withdrawing moisture condensed by the evaporating means to a point outside of said rooms.

2. Refrigerating apparatus including a cabinet located in a room, said cabinet including a machine compartment containing a motor-compressor unit and an evaporating means located outside the machine compartment, said machine compartment having an inlet for admitting air from the room and an outlet for the escape of air therefrom, a heat transfer coil located in said machine compartment connected to said compressor unit, and a condenser located outside said room connected in operative circuit relation with said compressor unit and said evaporating means.

3. Refrigerating apparatus including a cabinet located in a room, said cabinet including a machine compartment containing a motor-compressor unit and an evaporating means located outside the machine compartment, said machine compartment having an inlet for admitting air from the room and an outlet for the escape of air therefrom, means for conducting air from said outlet outside the room, a heat transfer coil located at the inlet of said machine compartment connected to said compressor unit, and a condenser located outside said room connected in operative refrigerant circuit relation with said compressor unit, said heat transfer coil and said evaporating means.

4. Refrigerating apparatus including a cabinet provided with a cooling compartment and a machine compartment located in a room to be cooled, a refrigerating system including a motor-compressor unit located in the machine compartment, a condenser located outside the room, said system also including a receiver for condensed liquid as well as an evaporating means located in the cooling compartment.

5. Air conditioning apparatus for conditioning air in a room or the like comprising, in combination, a cabinet disposed within said room, an evaporator within said cabinet, a motor-compressor unit within said cabinet, a condenser located outside of said room, refrigerant flow connections between said evaporator, compressor and condenser, and means for circulating air over said condenser, said last named means including a flexible conduit having one end communicating with the space surrounding said motor-compressor unit and its other end communicating with the air intake for said air circulating means.

6. Apparatus for conditioning air for a room or the like comprising, in combination, a cabinet disposed within said room, an evaporator within said cabinet, a motor-compressor unit within said cabinet, means for insulating said motor-compressor unit from said evaporator, a condenser located outside of said room, refrigerant flow connections between said condenser, evaporator and compressor, and means for supporting said condenser from said cabinet, said last named means including pivotal means for vertically adjusting said condenser relative to said cabinet.

7. Apparatus for conditioning air for a room or the like comprising, in combination, a cabinet disposed within said room, an evaporator within said cabinet, a motor-compressor unit within said cabinet, means for insulating said motor-compressor unit from said evaporator, a condenser located outside of said room, refrigerant flow connections between said condenser, evaporator and compressor, means for supporting said condenser from said cabinet, said last named means including pivotal means for vertically adjusting said condenser relative to said cabinet, and also including means for laterally adjusting said condenser relative to said cabinet.

8. Apparatus for conditioning air for a room or the like comprising, in combination, a cabinet disposed within said room, an evaporator within said cabinet, a motor-compressor unit within said cabinet, means for insulating said motor-compressor unit from said evaporator, a condenser located outside of said room, refrigerant flow connections between said condenser, evaporator and compressor, and means for supporting said condenser from said cabinet, said last named means including telescopic means for adjusting said condenser relative to said cabinet.

9. Refrigerating apparatus including a cabinet located in a room, an evaporator in said cabinet, means for circulating room air over said evaporator, a motor-compressor unit within said cabinet, means forming an insulated compartment within said cabinet enclosing said motor-compressor unit, a condenser unit, fluid flow connections between said evaporator, compressor and condenser, means for admitting room air into said motor-compressor compartment, condensate collecting means below said evaporator, means for conveying the condensate from said collecting means into the motor-compressor compartment, flexible conduit means leading from said compartment to the outside of said room, and means operated by said motor-compressor unit for discharging air and condensate from said motor-compressor compartment through said conduit means.

10. Refrigerating apparatus including a cabinet located in a room, an evaporator in said cabinet, means for circulating room air over said evaporator, a motor-compressor unit within said cabinet, means forming an insulated compartment within said cabinet enclosing said motor-compressor unit, a condenser unit, fluid flow connections between said evaporator, compressor and condenser, means for admitting room air into said motor-compressor compartment, condensate collecting means below said evaporator, means for conveying the condensate from said collecting means into the motor-compressor compartment, flexible conduit means leading from said compartment to the outside of said room, and means operated by said motor-compressor unit for discharging air and condensate from said motor-compressor compartment through said conduit means, said last named means comprising a rotating drum having externally disposed air impelling means and internally disposed water circulating means.

11. Air conditioning apparatus for a room having a window comprising, in combination, a cabinet disposed within said room, an evaporator within said cabinet, a motor-compressor compartment within said cabinet, a motor-compressor unit in said compartment, a condenser outside of said room, means located outside of said room for circulating outside air over said condenser, flexible refrigerant flow connections between said evaporator, compressor and condenser, and means for circulating room air over said compressor and said condenser in series, said last named means including a non-metallic flexible conduit passing through said window, condensate collecting means beneath said evaporator, and a condensate pump operated by one of said air circulating means for pumping condensate from said collecting means and discharging the same outside said window.

HARRY F. SMITH.